United States Patent [19]

Tourneux

[11] 4,336,413
[45] Jun. 22, 1982

[54] SOLAR PANELS

[75] Inventor: Michel Tourneux, Velizy Villacoublay, France

[73] Assignee: R.T.C. La Radiotechnique Compelec, Suresnes, France

[21] Appl. No.: 185,255

[22] Filed: Sep. 8, 1980

[30] Foreign Application Priority Data

Sep. 10, 1979 [FR] France .............................. 79 22596

[51] Int. Cl.³ ............................................ H01L 31/04
[52] U.S. Cl. ................................. 136/251; 52/173 R; 136/291
[58] Field of Search ...................... 136/244, 251, 291; 52/173 R, 518, 519, 536, 539

[56] References Cited

U.S. PATENT DOCUMENTS 4,040,867 8/1977 Forestieri et al. ................. 136/244
4,239,555 12/1980 Scharlack et al. ................. 136/251

FOREIGN PATENT DOCUMENTS 1900069 9/1970 Fed. Rep. of Germany ...... 136/291
2354430 6/1978 France ............................... 136/251

Primary Examiner—Aaron Weisstuch
Attorney, Agent, or Firm—Daniel M. Rosen

[57] ABSTRACT

The invention concerns a photovoltaic generating panel easily adaptable to a roof. The panel is equipped with a peripheral frame formed by the assembly of straight light alloy shapes. The particular form of these shapes makes possible the laying of adjacent panels with overlapping of the edges of the latter.

6 Claims, 13 Drawing Figures

SOLAR PANELS

This invention concerns a photovoltaic generating panel of generally quadrangular shape containing a multiple number of semiconductor solar cells inside a laminate, assuring the immobilization and protection of said cells, and means of connection on the periphery of said laminate making it possible, by partial overlapping of several identical panels, to assure weatherproofing by direct placement of said panel on the frame of a sloping roof.

A panel of this type is described in the French patent application filed on June 9, 1976 under No. 76 17 351, in the applicant's name. In that patent application it is indicated what are the advantages offered by panels which by themselves assure the tightness of a roof and the simplified placement of which resembles that of any conventional roofing element. The importance of such panels resides, notably, in the fact that they facilitate the spread of the use of photovoltaic solar energy for household use.

The applicant has in the past successfully tested a structure of photovoltaic generating panels using a laminate in which the solar cells are inserted between two sheets of glass and immobilized by means of a transparent synthetic resin. Such panels are now being marketed.

This invention is particularly well suited to that kind of laminated solar panel structure, although it is not exclusively applicable to same.

In fact, according to this invention, a photovoltaic generating panel of generally quadrangular shape, containing a multiple number of semiconductor solar cells inside a laminate assuring the immobilization and protection of said cells, and means of connection on the periphery of said laminate making it possible, by partial overlapping of several identical panels, to assure weatherproofing by direct placement of said panel on the frame of a sloping roof, is remarkable in that said connecting means consisting of a frame formed by four straight pieces, a first and a second of said pieces, fastened on the opposite edges of said laminate, which are intended to be pointed in the direction of pitch of the roof, have an identical section which is composed, on the one hand, of a U-shaped portion fitted sideways, by means of a sealing gasket, on said opposite edges of the laminate, which section is composed, on the other hand, of a shaped portion, integral with the U-shaped portion, containing a back in the extension of one of the side branches of said U, and at least one wing perpendicular to it, of height (h) less than the thickness (t) of said U-shaped portion, back and wing delimiting at least one sealing groove, and in that said first and second pieces are secured on said laminate in such a way that said sealing groove of each of them is pointed in an opposite direction.

As will be specified below, the panel according to the invention being intended to be directly laid on a roof frame, its sides are designed to occupy a given position in relation to the direction of flow of rain water. In other words, the panel according to the invention has to be oriented in its position on the slope of the roof: two opposite sides of the panel are intended to be pointed in the direction of pitch, while between the two other sides, level with the roof, one is the bottom side of the panel and the other the top side.

The shape and the proportions of the section of said first and second pieces offer the advantage that when several panels are assembled side by side by lateral partial overlapping, the assembly thus formed remains in one plane and makes possible easy placement without necessitating a special wedging of each panel. Furthermore, the straight pieces in question are simple and inexpensive.

According to one preferred embodiment of the invention, a third of said four straight pieces, fastened on the edge of the laminate intended to be pointed level with the roof and the bottom side of the panel, has a section identical to that of said first and second pieces, and it is similarly fitted on said laminate, the sealing groove of that piece being directed to emerge opposite the exposed face of the panel. Exposed face of the panel means the face of same which is pointed toward the rays of the sun, or the one on which the sensitive faces of the solar cells appear. This advantageous solution makes it possible to obtain three of the four pieces forming the frame from a straight shape of the same section, which notably simplifies the construction and lowers the cost of the panels according to the invention.

According to an equally preferred embodiment, a fourth of said four straight pieces, fastened on the edge of the laminate intended to be pointed level with the roof and on top side of the panel, is noteworthy for its section, which is composed, on the one hand, of a U-shaped portion similar to that of said first three pieces, fitted on the laminate in the same way and, on the other, of a shaped portion integral with it, containing at least one sealing wing, the height (H) of which has a value greater than the thickness (t) of said U-shaped portion, while being less than double that value, this wing pointing toward the exposed face of the panel. The panel according to the invention therefore offers the advantage of assuring, through the frame situated on its periphery, suitable weatherproofing by fitting with the adjoining panels just like a tile.

However, the shape and the proportions of the sections of the pieces constituting the frame are such that in the connecting zone where four panels join by overlapping, the thickness of the assembly does not exceed double the thickness of a single frame, which represents a considerable technical and aesthetic advantage.

The four framing pieces advantageously being finished at their ends by oblique sections partially affecting said U-shaped portions and also by straight sections, said third and fourth pieces have their straight ends resting on the straight longitudinal sections of said first and second pieces.

Other features, details and advantages of the invention will be revealed by the specification which follows, taking into account the attached drawings relating to nonlimiting examples.

Figure 1:
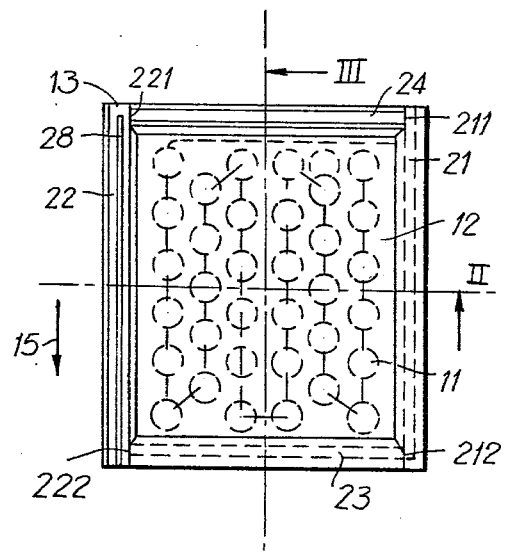
FIG. 1 represents a general plan view of a generating panel according to the invention.
Figure 3:
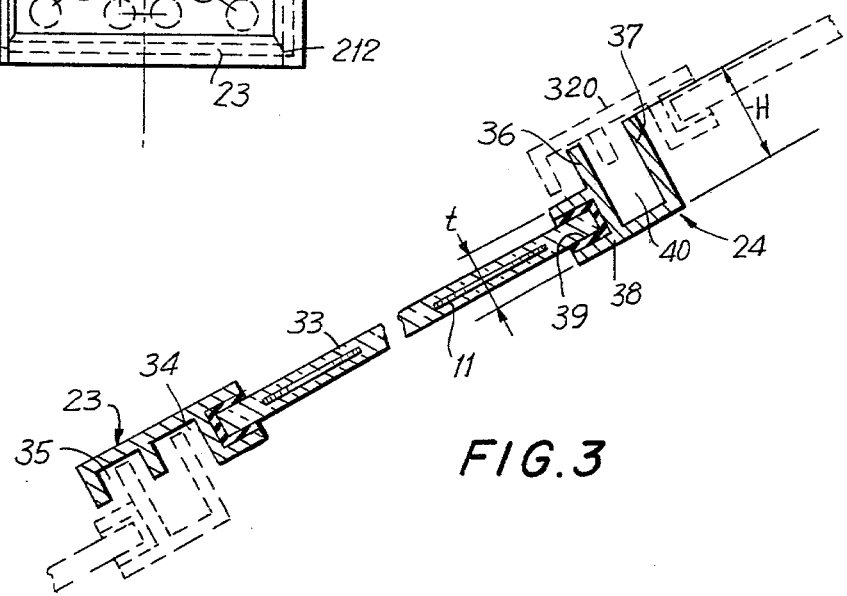

FIG. 3 also shows a section of the panel of FIG. 1, taken along line III.

Figure 4:
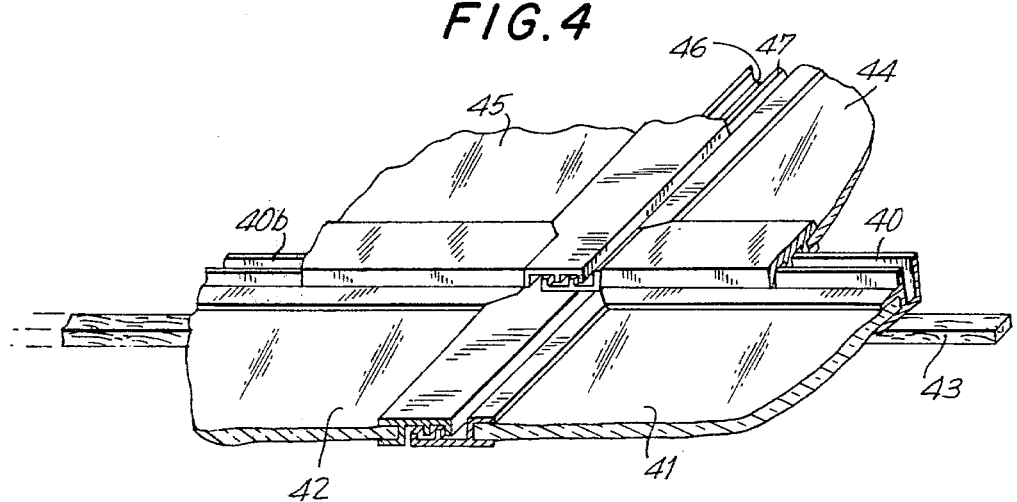

FIG. 4 is a partial view in perspective, showing the fitting of four adjacent panels, as they are presented, being laid on a frame.

FIGS. 5A, 5B, 6A and 6B illustrate in partial section two variants of the invention.

Figure 7:
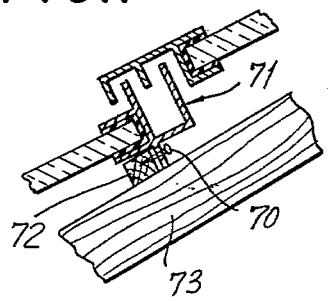
Figure 8:
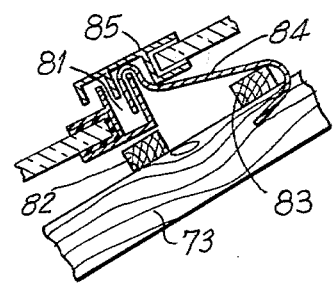

FIGS. 7 and 8 are partial sections showing two examples of fastening a panel on the frame according to the invention.

Figure 9:
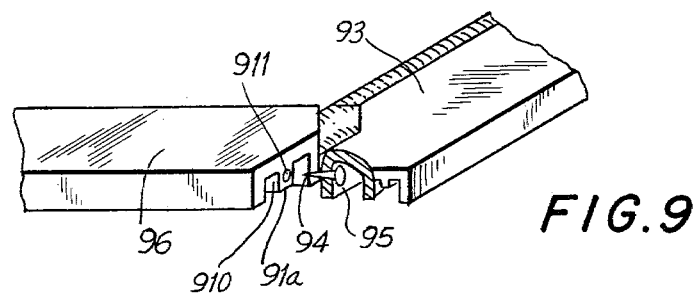

FIG. 9 is a partial view in sectional perspective illustrating a detail of the panel.

Figure 10:
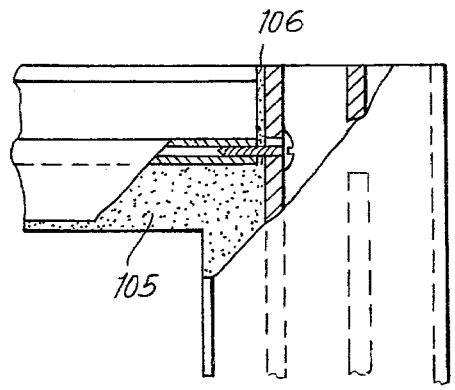

FIG. 10 illustrates in partially sectional plan one particular embodiment of the invention.

Figure 11:
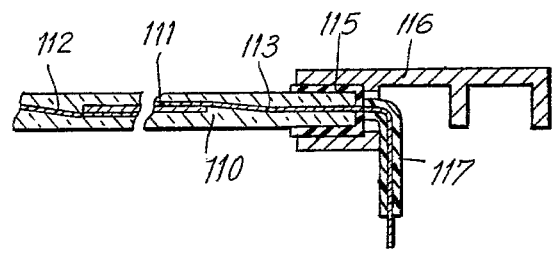

FIG. 11 is a partial sectional view, showing a working example of the means of electric connection provided for in this invention.

One view of a panel according to the invention is represented in plan on FIG. 1.

Of quadrangular general shape, the panel contains a multiple number of solar cells 11, made of a semiconductor, usually, silicon, inside a laminate 12 formed by two rigid sheets, at least one of which is glass, between which sheets a layer of transparent synthetic resin is inserted, inside which solar cells 11 are potted. Thus constituted, the laminate assures the immobilization and the protection of the solar cells, as well as that of the electric connections joining them.

Means of connection are provided on the periphery of the laminate, making it possible to assure weatherproofing, when a set of panels, such as that represented, is laid directly on the frame of a sloping roof.

According to the invention, these connecting means consist of four straight pieces 21, 22, 23, 24, forming a framing of laminate 12. As the panel is designed to be oriented in a given position in relation to the direction of flow of rain water, a direction represented by arrow 15, both pieces 21 and 22 are fastened on the edges of the laminate which are parallel to the direction of arrow 15, that is, in the direction of pitch of the roof. Piece 23 borders the side of the laminate intended to be directed level with the roof on the bottom side of the panel, while piece 24, which is opposite it, borders the laminate on the top side of the panel. The cross section of pieces 21 and 22 is represented on the sectional view of the panel shown in FIG. 2, a section taken along line II of the panel of FIG. 1. That section is composed, on the one hand, of a U-shaped portion 25, fitted laterally by means of a sealing gasket 26 of suitable elastomer, like synthetic rubber, on the edge of laminate 12, which section is composed of a shaped portion integral with and adjacent to portion 25, containing a back portion 27 in the form of an extension of one of the branches 25a of said U-shaped portion and two wings 28 and 29 perpendicular to back portion 27, which delimit two sealing grooves 30 and 31.

Figure 2:
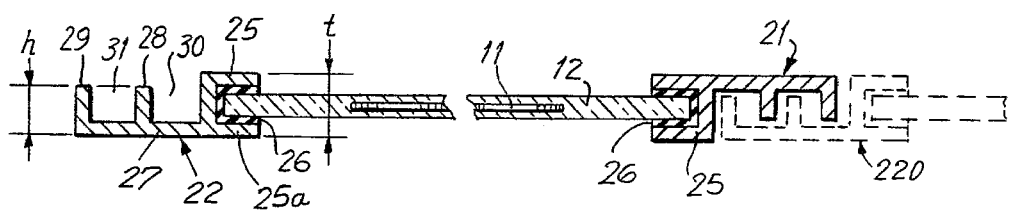
FIG. 2 shows in enlarged scale a section of the panel of FIG. 1 along line II.

The sections of pieces 21 and 22 are identical, but those pieces are fastened on the laminate according to FIGS. 1 and 2 in such a way that the sealing grooves 30, 31 of each of them are pointed in opposite directions. This makes possible, as illustrated on FIG. 2, a lateral connection by partial overlapping with the neighboring panel, represented by dashes at 220, an overlapping which assures weather proofing.

U-shaped portion 25 has a total thickness represented by (t), while the wings of the shaped portion have a height (h) less than (t), so that when the homologous shaped parts of two panels are fitted, the thickness (t) of the framing is not exceeded by the assembly thus formed. This offers the advantage of maintaining the flatness of a row of panels assembled at their edges parallel to the direction of pitch of the roof and further makes possible a flat overlapping of the panels in a perpendicular direction, that is, at their edges level with the roof, as will be described in greater detail below.

In accordance with the invention, piece 23, which is fastened on the edge of laminate 12 intended to be on the bottom side of the panel, has a section which is identical to that of pieces 21 and 22, and it is similarly fitted on the laminate with a sealing gasket. The cross section of that piece 23 is visible in FIG. 3, which shows a view in longitudinal section along line III of the panel of FIG. 1.

Sealing grooves 34, 35 of piece 23 are pointed opposite exposed face 33 of the laminate so as to make possible the proper flow of water in the direction of pitch of the roof.

In FIG. 3 the section of piece 23 completing the frame on the periphery of the laminate on the top side of the panel is also visible. That piece 24 has a section of shape different from that of pieces 21, 22, 23, which is characterized by sealing wings 36 and 37, the height (H) of which has a value exceeding the thickness (t) of U-shaped portion 38, which portion for its part is identical to that of the other pieces 21, 22 and 23. The height (H) is somewhat less than double the thickness (t), so that the assembly formed by framing with the coupled piece of a neighboring panel 320, represented by dashes, occupies a total thickness equal to double the value of (t).

U-shaped portion 38 is fastened in the manner previously indicated on the edge of the laminate by means of a sealing gasket 39, while the shaped part of the section containing sealing wings 36 and 37 is so directed that the latter point toward the exposed face 33 of the panel. Sealing wings 36 and 37 form, furthermore, a fitting recess coupled with the sealing grooves of the piece with which it is intended to be connected.

Preferably, as represented on FIG. 1, the four straight pieces 21, 22, 23, 24, forming the framing of laminate 12, are finished at their ends by oblique sections partially affecting the U-shaped portions and by straight sections. Pieces 23 and 24 have their straight ends resting on straight longitudinal sections 211, 221 and 212, 222 of pieces 21 and 22.

A partial division 13 of wing 28 and of the remaining partition of the U-shaped portion of piece 22 can advantageously be provided at its top end to permit the flow of water possibly trapped in groove 40 of piece 24.

The view in perspective of FIG. 4 indicates how four adjacent panels are connected, when they are assembled on a frame. The left edge of panel 41 is covered by the right edge of panel 42. Those two panels, which form a lower row, have their top edge resting on a batten 43 of the frame. Panel 44 of the upper row is then laid so that its bottom edge covers fitting recess 40a of panel 41 and then panel 45 is placed so as to cover recess 40b of panel 42 and simultaneously grooves 46, 47 of the side edge of panel 44. The top edges, not represented, of panels 44 and 45 also rest on another batten of the frame. It is clear that by proceeding this way with the panel, according to the invention, considerable play is left in the directions of the plane of the roof so that expansion of the elements and some deformation of the frame cannot produce any appreciable strain on the panels.

Figure 5A:
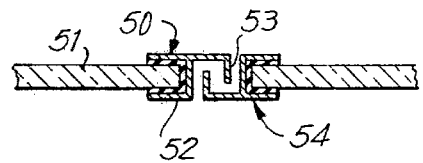
Figure 5B:
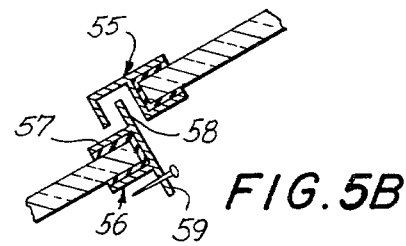

Reference is now made to FIGS. 5A and 5B, which illustrate in schematic section the sections of framing pieces of a panel according to a variant of the invention. On FIG. 5A side piece 50 bordering laminate 51 on the right side has a section containing a U-shaped portion 52, but the shaped portion of that section, which is integral with it, in contrast to that represented on FIG. 2, possesses only one wing 53 instead of two. Fitting with the left side piece 54 of the neighboring panel is made with a single sealing groove, according to that simplified version of the invention.

FIG. 5B shows how the section of piece 55 bordering the bottom side of a panel is connected with piece 56 bordering the top side of a panel of a lower row. The piece 56 presents here, outside U-shaped portion 57, fitted laterally on the top edge of the laminate, an integral shaped portion containing only one sealing wing 58, the height of which has a value respecting the condition previously indicated. In that figure an example of a framing piece has been represented for the top side of the panel, the section of which further contains an extra wing 59 pointing in the opposite direction from sealing wing 58 and which makes possible the fastening of the panel on a batten of the frame by a nail or screw, according to the method of mounting described in connection with FIG. 7.

Figure 6A:
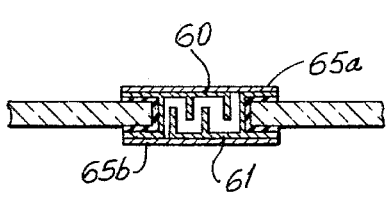
Figure 6B:
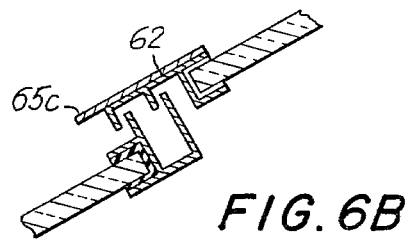

FIGS. 6A and 6B illustrate another variant of the invention, presented by way of example within the framework of a double groove sealing, according to which variant the side framing pieces 60, 61 and framing piece 62 on the bottom side of the panel each have an identical section. That section, similar to the one represented on FIGS. 2 and 3, contains, however, a hip sheet extension 65a, 65b, 65c, which reinforces the seal against running water and improves to some extent the appearance of the set of panels laid, hiding the lateral joint space between two panels.

FIG. 7 indicates by a schematical sectional view a method of fastening of the panel according to the invention by nail or screw crossing the extra wing 70 of piece 61 provided for that purpose over the whole length of that piece. The panel then rests at its top edge on the batten 72 to which it is fastened, while batten 72 is in turn fastened on rafter 73 in the usual manner.

FIG. 8 illustrates a variant in the method of fastening, according to which variant an extra fastening wing is not necessarily present at the section of framing piece 81 bordering the top side of the panel. According to this method of fastening, the top side of the panel rests on a first batten 82, while a second batten 83, near the preceding one, provides the anchor point for a hook 84 of the appropriate shape indicated on the figure, which hook is moreover bent back in the fitting recess of piece 81. The panel is then thus held in the direction sliding in which it is pulled by its own weight. Hook 84, which can, for example, be made of steel wire with a protective coating is covered by framing piece 85 of the adjacent panel. This advantageous arrangement, on the one hand, renders it invisible from the outside and, on the other hand, protects it from corrosion.

In general and independent of the variants so far described, each of the four straight pieces forming the framing of the panel according to the invention is advantageously obtained from extruded aluminum alloy shapes. Shapes of this kind are moreover well known and widely used, notably, for metal joinery.

One of the advantages of the invention resides in the fact that only two different sections, differing only in shape, are necessary for making a panel, which makes possible an appreciable saving on the extrusion mandrels necessary for the fabrication of these shapes.

Mounting of the panel according to the invention is very simple.

The laminated sheet containing the solar cells connected with each other is made, first, in quadrangular shape, according to a technique well known by itself. The four pieces forming the framing, drawn from shapes of the section previously described, cut to length and machined in a partially oblique section in the manner already indicated, are fitted laterally on the four edges of the laminate by inserting a sealing gasket. That gasket is preferably made of an elastomer, such as synthetic rubber, and has a thickness designed to ensure a tight fit of the periphery of the laminate in the U-shaped portions of the sections of the framing pieces. That fitting can by itself ensure the mechanical strength of the framing. However, the framing pieces can also be fastened together by screws, according to the indications given on FIG. 9. At each corner of the panel the partition 95 remaining after the partial section of the U-shaped portion of piece 93 is bored. The head of a self-tapping short screw 94 is pressed on said partition 95, while the threaded part of that screw enters a thickening 910 of wing 91a of piece 96. Thickening 910 is obtained directly, for that purpose, during extrusion of piece 96, just as hole 911 can also be obtained during extrusion, if desired.

The tightness of the assembled frame on the laminate is assured mainly by the sealing gasket already mentioned. It is desirable to complete that tightness at the corners of the frame, which can be accomplished by using different techniques known in the art. By way of example, a plastic or elastomer tongue can be inserted, on mounting, between each straight longitudinal section 211, 221, 212, 222 of pieces 21 and 22 (FIG. 1) and the end sections of pieces 23 and 24, so that said tongue is squeezed between those pieces at the time of fastening by the connecting screw.

According to one advantageous embodiment, the U-shaped sealing gasket (26, 39) is prepared in a single piece by moulding to dimensions according to those of the laminate.

It can then be arranged, as illustrated on FIG. 10, for sealing gasket 105 to contain a tongue 106 at each of the corners of the panel, the tongue being of the same material as gasket 105 and derived from moulding at the same time as the latter. Assembly of the frame on the laminate is very much simplified in this case.

FIG. 11 indicates how outlet of the electric connections of the panel, according to the invention, can be made. Laminate 110 contains solar cells 111 which are electrically connected to each other by metal strips such as 112, in a manner by itself known. Metal strips 113, terminals of the network of cells, emerge from laminate 110 at the edge of the latter, pass through appropriate openings in sealing gasket 115 and framing piece 116, are then bent back along the U-shaped portion of piece 116, from which they pass inside the building, and are then accessible to make the desired connections. Sheathing 117 protects strip 113 from contact with the adjoining metal parts. It can be arranged, according to a variant not represented, for sheathing 117 to be of the same material as sealing gasket 115 and made by moulding at the same time as the latter in the form of an adjoining appendage.

It is clearly apparent from the specification of the photovoltaic generating panel according to the invention that the latter can be incorporated extremely easily in the roof of a building on the favorably exposed slope, as replacement of the existing roofing. Specially designed to permit direct placement on the frame, it requires only a very slight modification of the latter, consisting of adjusting the proper spacing of the battens. That is why the panel according to the invention offers the advantage of very flexible adjustment to its support.

It is also very easy to modify an installation in order to change the number of panels in operation and thus adapt it to new energy needs.

The sealing connection of a panel or group of panels with the traditional roofing part poses no problem for one versed in the art, who will usually make that connection with metal strips in which the necessary bends are provided, in order to be coupled with the grooves and recesses present on the periphery of the panels.

What is claimed is:

1. A photovoltaic generating panel of generally quadrangular shape having a multiple number of semiconductor solar cells inside a laminate for immobilizing and protecting said cells and connecting means on the periphery of said laminate partially overlapping several identical panels to assure waterproofing by direct laying of said panels on the frame of a sloping roof, said connecting means comprising:

first and second frame pieces fastened on opposite edges of said laminate pointed in the direction of the pitch of the roof and having identical sections including a U-shaped portion fitted side ways on opposite edges of a said laminate, an extension of one side of the branches of said U, and at least one wing perpendicular to said extension having a height less than the thickness of said U-shaped portion, said extension and wing forming at least one sealing groove, said sealing grooves of said first and second pieces pointing in opposite directions;

a third frame piece fastened on the bottom edge of said laminate pointed level with the roof and having a section identical to that of said first and second frame pieces, the sealing groove of said third frame piece directed to emerge opposite the exposed face of said panel; and a fourth frame piece fastened on the top edge of said laminate pointed level with the roof and having a section including a U-shaped portion similar to that of said first three framed pieces and at least one sealing wing having a height which is greater than the thickness of said U-shaped portion and less than double the thickness of said U-shaped portion, and said wing being directed to emerge toward the exposed face of the panel.

2. The generating panel of claim 1, wherein said four framing pieces are finished at their ends by oblique sections partially intersecting said U-shaped portions and also by straight sections, said third and fourth frame pieces having their straight ends resting on the straight longitudinal section of said first and second frame pieces.

3. The generating panel according to claim 1, wherein said first, second and third pieces have a section, the shaped portion of which contains two wings thus delimiting two sealing grooves, and in that said fourth piece has a section, the shaped portion of which contains two sealing wings delimiting a fitting recess which is adapted to be coupled with the sealing grooves of said third piece of an adjacent panel.

4. The generating panel according to claim 1, wherein said fourth piece has a section which also contains an extra wing pointing in the opposite direction of said sealing wing, making possible the fastening of the panel of the roof frame.

5. The generating panel according to claim 1, wherein each of said four straight pieces forming said frame consists of an aluminum alloy shaped by extrusion.

6. The generating panel according to claim 1 including a sealing gasket between said U-shaped portions and said laminate.

* * * * *

UNITED STATES PATENT AND TRADEMARK OFFICE
CERTIFICATE OF CORRECTION

PATENT NO. : 4,336,413
DATED : June 22, 1982
INVENTOR(S) : Michel Tourneux

It is certified that error appears in the above—identified patent and that said Letters Patent is hereby corrected as shown below:

Column 1, line 18, change "placement" to --laying--.

Signed and Sealed this

Twentieth Day of March 1984

[SEAL]

Attest:

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,336,413
DATED : June 22, 1982
INVENTOR(S) : Michel Tourneux

It is certified that error appears in the above—identified patent and that said Letters Patent is hereby corrected as shown below:

Col. 8, line 29, change "of" to --on--.

Signed and Sealed this

Seventeenth Day of July 1984

[SEAL]

Attest:

Attesting Officer

GERALD J. MOSSINGHOFF

Commissioner of Patents and Trademarks